Patented Sept. 24, 1935

2,015,606

UNITED STATES PATENT OFFICE 2,015,606

PROCESS FOR PRODUCING FATTY ESTERS

Harvey D. Royce, Savannah, Ga., assignor to The Southern Cotton Oil Company, New Orleans, La., a corporation of New Jersey No Drawing. Application July 21, 1934, Serial No. 736,438

7 Claims. (Cl. 87—12)

My invention relates to a new and improved process for producing fatty esters and has to do, more particularly, with a method for the manufacture of hydrophyllic fatty acid esters of polyhydric alcohols, such as the mono- and di-glycerides of fatty acids.

It has been proposed, heretofore, to form mono- and di-glycerides of the fatty acids by reacting natural fatty tri-glycerides with glycerol. In the absence of catalysts, this reaction is very slow under practical working conditions and a good yield of an edible ester by such means has not proved feasible heretofore. It has been proposed to accelerate the re-esterification reaction by high temperatures, violent agitation and pressure but, under actual working conditions, even when so accelerated, the reaction is slow and the yields low. It has been customary, therefore, to carry on this re-esterification reaction in the presence of catalysts, such as acids, bases, salts, soaps, alcoholates or other metallic derivatives. Such catalysts, however, generally contaminate the reaction product so that a refining operation is required for the production of pure, edible esters by this process.

The principal object of my invention, therefore, is to provide a process for the production of incompletely esterified products, such as mono- and di-glycerides of the fatty acids, by re-esterification of natural fatty esters, which does not involve the use of a catalyst differing in character from the desired product of reaction and, nevertheless, gives a rapid and substantial yield of the desired esters.

Further objects, and objects relating to details and economies of operation, will definitely appear from the detailed description to follow. In one instance, I have accomplished the objects of my invention by the means set forth in the following specification. My invention is clearly defined and pointed out by the appended claims.

In general, my invention consists in promoting the re-esterification reaction, so that it proceeds rapidly and gives a good yield, by adding a quantity of pre-formed mono- and/or di-glyceride, or other incompletely esterified ester, of a fatty acid, to a mixture comprising a neutral fat and a polyhydric alcohol. I have found that this procedure promotes the re-esterification reaction and gives a good yield of the desired esters in pure form. In this manner, the desired products can be obtained in an hour or less at temperatures as low as 220° C., whereas, in the absence of such promoters, little or no re-esterification occurs under such conditions. Moreover, in accordance with my invention, I may use as a reaction promoting agent a substance identical with the desired product of reaction, so that a subsequent separation of the promoting agent is not necessary. This is an advantage over processes involving the use of the common esterification catalysts, such as metallic oxides, salts, alcoholates or soaps.

For instance, 100 parts of neutral refined cottonseed oil were mixed with 20 parts of glycerol and heated to 240° C. in a glass flask equipped with an agitator and through which a stream of hydrogen was passed. No reaction was detectable after three hours of heating and strong agitation. However, when 40 parts of monoglycerides of cottonseed fatty acids, having an acetyl number of 150, were added to the mixture of 100 parts of neutral refined cottonseed oil and 20 parts of glycerol, at 240° C., the re-esterification or conversion of the tri-glycerides to mono- and di-glycerides proceeded rapidly, and after two hours at 240° C., most of the glycerol present was combined. The acetyl number or value of the product was 160 and it exhibited the solubility in alcohol and the hydrophyllic properties characteristics of the mono- and di-glycerides.

I have found that my present invention is especially useful in the promotion of the re-esterification of those natural fats and oils which are essentially neutral and contain no appreciable amount of free fatty acids. On the whole, this comprises all of the commercial edible fats and oils, which have been subjected to alkali refining, bleaching or deodorizing and which, upon titration, show less than 0.2 per cent free fatty acid, calculated as oleic acid. My present invention facilitates the production of edible, ash-free monoglyceride concentrate in one operation, by the re-esterification of neutral fatty tri-glycerides with polyhydric alcohols. The product thus obtained may be incorporated directly in an edible fatty composition, or, if desired, it may be first subjected to the refining process described in my co-pending application, Ser. No. 736,439, entitled Edible fatty esters and the process of producing the same, filed of even date herewith.

I am aware that the process herein described is susceptible of considerable variation without departing from the spirit of my invention and, therefore, I claim my invention broadly, as indicated by the appended claims.

What I claim is:

1. The process of producing fatty esters which comprises heating at a temperature of 200° C. to 250° C. a mixture of neutral fatty tri-glycerides, a polyhydric alcohol and pre-formed, incompletely esterified fatty esters of polyhydric alcohols.

2. The process of producing incompletely esterified fatty esters of polyhydric alcohols which comprises heating at a temperature of 200° C. to 250° C. a mixture of neutral fatty tri-glycerides, a polyhydric alcohol and preformed incompletely esterified fatty esters of polyhydric alcohols corresponding to the desired product of reaction.

3. The process of producing incompletely esterified fatty esters of polyhydric alcohols which comprises heating a mixture of neutral fatty tri-glycerides, a polyhydric alcohol and pre-formed, incompletely esterified, fatty esters of polyhydric alcohols, at a temperature exceeding 200° C., for a period of thirty minutes or more.

4. The process of producing mono-glycerides of the fatty acids which comprises heating at a temperature of 200° C. to 250° C. a mixture of neutral tri-glycerides of the fatty acids, glycerol and pre-formed mono-glycerides of the fatty acids.

5. The process of producing mono-glycerides of the fatty acids which comprises heating a mixture of neutral tri-glycerides of the fatty acids, glycerol and pre-formed mono-glycerides at a temperature exceeding 200° C. for a period of time exceeding thirty minutes.

6. The process of producing mono-glyceride concentrate comprising the heating of a mixture of cottonseed oil, glycerol and pre-formed mono-glycerides of cottonseed fatty acids at a temperature of 200° C. to 250° C.

7. The process of producing mono-glycerides of the fatty acids which comprises heating a mixture of 60 to 80 parts of neutral tri-glycerides of the fatty acids, 10 to 30 parts of glycerol and 10 to 50 parts of pre-formed mono-glycerides, at a temperature of 200° C. to 250° C., in a non-oxidizing atmosphere, under agitation, for from one to ten hours.

HARVEY D. ROYCE.